(12) United States Patent
Peiffer et al.

(10) Patent No.: US 6,410,132 B1
(45) Date of Patent: Jun. 25, 2002

(54) BIAXIALLY ORIENTED POLYPROPYLENE FILM, THE USE OF THE FILM AND PROCESS FOR ITS PRODUCTION

(75) Inventors: Herbert Peiffer, Mainz; Richard Lee Davis, Wiesbaden; Joerg Hellmann, Mainz, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/396,514

(22) Filed: Sep. 15, 1999

(30) Foreign Application Priority Data

Sep. 16, 1998 (DE) ........................... 198 42 376

(51) Int. Cl.$^7$ ................. B32B 15/08; B29C 55/12
(52) U.S. Cl. ............... 428/336; 264/210.7; 264/290.2; 428/451; 428/461; 428/515; 428/516; 428/903.3; 428/910
(58) Field of Search ............... 264/210.7, 290.2; 428/336, 451, 461, 515, 516, 903.3, 910

(56) References Cited

U.S. PATENT DOCUMENTS

| | | | |
|---|---|---|---|
| 3,515,626 A | 6/1970 | Duffield | |
| 3,958,064 A | 5/1976 | Brekken et al. | |
| 4,042,569 A | 8/1977 | Bell et al. | |
| 4,252,885 A | 2/1981 | McGrail et al. | |
| 4,399,179 A | 8/1983 | Minami et al. | |
| 4,405,775 A | 9/1983 | Hashimoto | 526/351 |
| 4,493,872 A | 1/1985 | Funderburk et al. | |
| 4,615,939 A | 10/1986 | Corsi et al. | |
| 4,622,237 A | 11/1986 | Lori | |
| 5,236,680 A | 8/1993 | Nakazawa et al. | |
| 5,236,683 A | 8/1993 | Nakazawa et al. | |
| 5,242,757 A | 9/1993 | Buisine et al. | |
| 5,425,996 A | 6/1995 | Wilkie et al. | 428/461 |
| 5,429,785 A | 7/1995 | Jolliffe | |
| 5,453,260 A | 9/1995 | Nakazawa et al. | |
| 5,468,527 A | 11/1995 | Peiffer et al. | |
| 5,506,014 A | 4/1996 | Minnick | |

FOREIGN PATENT DOCUMENTS

| | | |
|---|---|---|
| DE | 1694404 | 4/1971 |
| DE | 2230970 | 2/1973 |
| DE | 3801535 | 7/1988 |
| DE | 4306155 | 9/1994 |
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 236 945 | 9/1987 |
| EP | 0 347 646 | 12/1989 |
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 524 725 | 1/1993 |
| EP | 0 580 404 | 1/1994 |
| EP | 0 602 964 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 747 212 | 12/1996 |
| EP | 0 826 478 | 3/1998 |
| EP | 0 878 298 | 11/1998 |
| GB | 1 398 476 | 6/1975 |
| WO | WO 94/13476 | 6/1994 |
| WO | WO 94/13481 | 6/1994 |
| WO | WO 98/13414 | 4/1998 |
| WO | WO 98/13415 | 4/1998 |
| WO | WO 88/10188 | 12/1998 |

OTHER PUBLICATIONS

Weiss, J., Parameters that influence the barrier properties of metallized polyester and polypropylene films, 204 Thin Solid Films 203–216 (1991).

Kimura, S.F. et al., FTIR Spectroscopic Study on Crystallization Process of Poly (ethylene–2,6–naphthalate), 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; Class A23, AN 96–148338, XP002114377 & JP 08 03679 A (Toray Indus., Inc.) (Feb. 6, 1996).

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

Patent Abstracts of Japan, vol. 1996, No. 04, Apr. 30, 1996 & JP 07 329258 A (Toray Ind Inc), Dec. 19, 1995.

Derwent Abstract of EP 0 747 212 (Dec. 11, 1996).

*Primary Examiner*—D. S. Nakarani
(74) *Attorney, Agent, or Firm*—Finnegan, Henderson, Farabow, Garrett & Dunner L.L.P.

(57) ABSTRACT

The invention relates to a biaxially oriented polypropylene film which has good processing performance and, after it has been metallized or oxidically coated, is a very good barrier to oxygen, and which is composed of at least a base layer, wherein the planar orientation delta p of the film is greater than 0.0138.

29 Claims, No Drawings

BIAXIALLY ORIENTED POLYPROPYLENE FILM, THE USE OF THE FILM AND PROCESS FOR ITS PRODUCTION

The invention relates to a biaxially oriented polypropylene film composed of at least a base layer. The film has good processing performance and good optical properties and, after it has been metallized or has been coated with oxidic materials, is a very good oxygen barrier. The invention further relates to the use of the film and to a process for its production.

BACKGROUND OF THE INVENTION

1. Field of the Invention

Biaxially oriented polypropylene films are used in packaging and in industrial sectors, especially where there is a need for their advantageous properties, i.e., good optical properties, high mechanical strengths, good barrier effectiveness in particular with respect to gases, good dimensional stability when heated and excellent layflat.

In packaging applications for food and drink, high barrier effectiveness against gases, water vapor and flavors is generally demanded (this having the same significance as low permeation). A well known process for producing packaging of this type consists in high-vacuum aluminum metallizing of the plastic films used for this purpose. Other well known processes consist in coating the films with oxidic materials (e.g., $SiO_x$, or $Al_xO_y$) or with water glass. Essentially, the coatings used are transparent.

The effectiveness of the barrier against the substances mentioned above depends essentially on the type of the polymers in the film and the quality of the barrier layers applied. Thus, very high barrier effectiveness against gases, such as oxygen and flavors, is achieved in metallized or oxidically coated, biaxially oriented polypropylene films. A highly effective barrier against water vapor is best achieved with metallized or oxidically coated, bilaxially oriented polypropylene films. There are other applications in which both a very effective water vapor barrier and an acceptable oxygen barrier are desirable.

2. Description of Related Arts

In the prior art, there is neither sufficient knowledge of the detailed basis for the barrier effect in metallized or oxidically coated biaxially oriented polypropylene films nor of how this may be decisively improved. Variables which are clearly important are the substrate surface, the type of substrate polymer and its morphology. It is generally assumed that smooth substrate surfaces result in better barrier properties.

The dissertation by H. Utz (Technische Universtät München, 1995: "Barriereeigenschaften aluminiumbedampfter Kunststoffolien" [Barrier properties of aluminum-metallized plastic films]) gives detailed results of investigations on the influence of the substrate surface on barrier properties in various plastic films.

DESCRIPTION OF THE INVENTION

An object of the present invention is thus to provide a mono- or coextruded, biaxially oriented polypropylene film which also has good optical properties. After it has been metallized or has been coated with oxidic materials, the film should also, compared with the prior art, be a better oxygen barrier and be easy to produce and to process.

The gloss, at least of the surface to be vapor-coated, should be greater than 120, and the haze of the film should be less than 3.0%.

In the present case low oxygen permeation means that less than 30 $cm^3$ of oxygen per square meter per day should diffuse through the metallized or oxidically coated film when it is exposed to air with a pressure of 1 bar.

In terms of other properties the film should be at least as good as known packaging films of this type. It should, for example, be easy and cost-effective to produce, and process easily (i.e., not block) on conventional machinery.

The object is achieved by means of a biaxially oriented polypropylene film (OPP film) having one or more layers and with at least a base layer B, which at least 50% by weight is composed of thermoplastic polypropylene, and the film has a planar orientation delta p which is greater than 0.0138.

To achieve the desired oxygen permeation of metallized or oxidically coated films according to the invention, the planar orientation delta p of the novel film must be greater than a prescribed value. This value is given by delta p=0.0138.

Therefore, to achieve good oxygen barriers in metallized or oxidically coated OPP films, a high planar orientation delta p is required. If the planar orientation delta p of the film is smaller than the value stated above, the barrier in the sense defined here is poor. If the planar orientation delta p of the film is greater than the value stated above, the barrier in the sense defined here is good.

In a preferred embodiment of the novel film, the planar orientation delta p of the novel film is greater than 0.0140, and in a very particularly preferred embodiment it is greater than 0.0143.

In the preferred and particularly preferred embodiments the novel film is, in its metallized or oxidically coated form, a very good oxygen barrier.

Moreover, it has proven advantageous for achieving a high barrier for the refractive index $n_{ND}$, ($N_a$) in the direction of the thickness of the film to be less than a prescribed value. This value is $n_{ND}$=0.1495.

According to the invention, the film has at least a one-layer structure. As a one-layer structure, the film comprises a layer which is a base layer B and comprises the pigments necessary for the processing of the film. However, the film may have a two-layer structure. It then comprises layers which are a base layer B and the outer layer A. In a preferred embodiment of the invention, the film has a three-layer structure and has, on one side of the layer B (=base layer), the layer A, and on the other side of the layer B, another layer C made from polypropylene. In this case at least one of the two outer layers, but preferably both outer layers, comprise(s) the pigments required for the production and processing of the film.

In principle, a variety of raw materials may be used as materials for the various layers. However, it is preferable for the production of the individual layers to be based on polypropylene raw materials.

The base layer of the novel film that has more than one layer comprises polyolefins, preferably propylene polymers, and other additives if desired, in effective amounts in each case. The base layer generally comprises at least about 50% by weight of the propylene polymers, preferably from about 75 to 100% by weight, more preferably from about 80–100%, and in particular from 90 to 100% by weight, based in each case on the base layer. The polypropylene is also preferably a thermoplastic polypropylene and can contain internal and inert particles.

The propylene polymer generally contains from 90 to 100% by weight of propylene units, preferably from 95 to 100% by weight, in particular from 98 to 100% by weight, and generally has a melting point of 120° C. or above, preferably from 150 to 170° C., and generally has a melt flow index of from 0.5 to 8 g/10 min, preferably from 2 to 5 g/10 min, at 230° C. and with a force of 21.6N (DIN 53 735). Preferred propylene polymers for the base layer are isotactic propylene homopolymers with an atactic proportion of 15% by weight or below, copolymers of ethylene and propylene with an ethylene content of 10% by weight or below, copolymers of propylene with $C_4$–$C_8$ α-olefins with an α-olefin content of 10% by weight or below, and terpolymers of propylene, ethylene and butylene with an ethylene content of 10% by weight or below and with a butylene content of 15% by weight or below, and particular preference is given to isotactic propylene homopolymer. The percentages by weight given relate to the respective polymer.

A mixture of the abovementioned propylene homopolymer and/or copolymers and/or terpolymers and/or other polyolefins, in particular those made from monomers having from 2 to 6 carbon atoms, is also suitable if the mixture comprises at least 50% by weight of propylene polymer, in particular at least 75% by weight. Other polyolefins which are suitable in the polymer mixture are polyethylenes, in particular HDPE, LDPE and LLDPE, if the proportion of these polyolefins, based on the polymer mixture, does not exceed 15% by weight in each case. In a preferred embodiment of the novel film the propylene polymer of the base layer is peroxidically degraded. This can also give a still further improvement in the barrier properties of the metallized or oxidically coated films.

A measure of the degree of degradation of the polymer is the degradation factor A, which gives the relative change in the melt flow index (measured in accordance with DIN 53 735) of the propylene polymer, based on the starting polymer.

$A = MFI_1 / MFI_2$ $MFI_1$ = Melt flow index of the propylene polymer before adding the organic peroxide $MFI_2$ = Melt flow index of the peroxidically degraded propylene polymer The degradation factor A of the propylene polymer used is generally in the range from 3 to 15, preferably from 6 to 10. Particularly preferred organic peroxides are dialkyl peroxides, where alkyl radicals are understood to be the saturated straight-chain or branched lower alkyl radicals having up to 6 carbon atoms. Particular preference is given to 2,5-dimethyl-2,5-di(tert-butylperoxy)hexane and di-tert-butyl peroxide.

The base layer may generally comprise effective amounts in each case of stabilizers and neutralizing agents, and also, if desired, lubricants, antistats and/or hydrocarbon resins. The hydrocarbon resins, in particular, may be utilized to improve the barrier properties of the metallized or oxidically coated films.

Preferred resins are in particular hydrocarbon resins. The hydrocarbon resins may be hydrogenated, partially or completely. Possible resins are in principle synthetic resins or resins from natural sources. It has proven particularly advantageous to use resins with a softening point above 80° C. (measured in accordance with DIN 1995-U4 or ASTM E-28). Those with a softening point from 100 to 180° C., in particular from 120 to 160° C., are preferred. The resin is preferably incorporated into the film in the form of a masterbatch, which is added into the extruder (e.g., single-screw or cascade extruder). Examples of masterbatches are those comprising from 30 to 70% by weight, preferably 50% by weight, of propylene homopolymer and from 70 to 30% by weight, preferably 50% by weight, of hydrocarbon resin. The percentage by weight data are based on the total weight of propylene polymer and hydrocarbon resin.

Among the numerous resins, preference is given to hydrocarbon resins and specifically to petroleum resins, styrene resins, cyclopentadiene resins and terpene resins. These resins are described in Ullmanns Enzyklopädie der techn. Chemie [Ullman's Encyclopedia of Industrial Chemistry] 4th edition, Vol. 12, pages 525–555.

Petroleum resins are those hydrocarbon resins which are prepared by polymerizing deep-decomposed petroleum materials in the presence of a catalyst. These petroleum materials typically comprise a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers, such as methylstyrene, vinyltoluene and butadiene. The cyclopentadiene resins are cyclopentadiene homopolymers or cyclopentadiene copolymers, obtained from coal-tar distillates and fractionated petroleum gas. These resins are prepared by holding the materials, which comprise cyclopentadiene, at a high temperature for a long period. Depending on the reaction temperature, dimers, trimers or oligomers may be obtained.

The terpene resins are polymers of terpenes, i.e., of hydrocarbons of the formula $C_{10}H_{16}$ present in almost all essential oils and in oil-containing resins from plants, or are phenol-modified terpene resins. Specific examples of terpenes which may be mentioned are pinene, α-pinene, dipentene, limonene, myrcene, camphene and the like. The hydrocarbon resins may also be those known as modified hydrocarbon resins. The modification generally takes place by reacting the raw materials prior to polymerization, by introducing specific monomers or by reacting the polymerized product, in particular for hydrogenation or partial hydrogenation reactions.

Other hydrocarbon resins used are styrene homopolymers, styrene copolymers, cyclopentadiene homopolymers, cyclopentadiene copolymers and/or terpene polymers with a softening point above 100° C. in each case. In the case of unsaturated polymers, the hydrogenated product is preferred.

Very particular preference is given to using the cyclopentadiene polymers with a softening point of 140° C. and above in the base layer.

If its structure has more than one layer, the film comprises at least an outer layer A, which has been applied to the abovementioned base layer B. This outer layer may in principle be comprised of the polymers used for the base layer. Other materials besides these may also be present in the outer layer, in which case the outer layer then is preferably composed of a mixture of polymers, copolymers and/or a homopolymer. The same applies to the outer layer C of a film having three or more layers.

The outer layer A (and the outer layer C, if present) is (are) generally comprised of polymers of α-olefins having from 2 to 10 carbon atoms.

The outer layer generally comprises:
a propylene homopolymer; or
a copolymer of
  ethylene and propylene, or
  ethylene and butylene, or
  propylene and butylene, or
  ethylene and another α-olefin having from 5 to 10 carbon atoms, or propylene and another α-olefin having from 5 to 10 carbon atoms; or a terpolymer of
ethylene and propylene and butylene, or
ethylene and propylene and another α-olefin having from 5 to 10 carbon atoms; or a mixture made from two or more of the homopolymer, copolymers and terpolymers mentioned; or a blend made from two or more of the homopolymer, copolymers and terpolymers mentioned, if desired mixed with one or more of the homopolymer, copolymers and terpolymers mentioned.

The outer layer particularly preferably comprises essentially:
a propylene homopolymer; or
a copolymer of
ethylene and propylene, or
ethylene and 1-butylene, or
propylene and 1-butylene; or
a terpolymer of
ethylene and propylene and 1-butylene; or
a mixture made from two or more of the particularly preferred homopolymer, copolymers and terpolymers mentioned; or
a blend made from two or more of the particularly preferred homopolymer, copolymers and terpolymers mentioned, if desired mixed with one or more of the homopolymer, copolymers and terpolymers mentioned;

and preference is given in particular to propylene homopolymers or
random ethylene-propylene copolymers with
an ethylene content of from 1 to 10% by weight, preferably from 2 to 8% by weight; or
random propylene-1-butylene copolymers with
a butylene content of from 4 to 25% by weight, preferably from 10 to 20% by weight,
based in each case on the total weight of the copolymer; or
random ethylene-propylene-1-butylene terpolymers with
an ethylene content of from 1 to 10% by weight, preferably from 2 to 6% by weight, and
a 1-butylene content of from 3 to 20% by weight, preferably from 8 to 10% by weight,
based in each case on the total weight of the terpolymer; or
a blend made from an ethylene-propylene-1-butylene terpolymer and
a propylene-1-butylene copolymer
with an ethylene content of from 0.1 to 7% by weight
and a propylene content of from 50 to 90% by weight
and a 1-butylene content of from 10 to 40% by weight,
based in each case on the total weight of the polymer blend.

The propylene homopolymer, used in the outer layer, comprises predominantly (at least 90% by weight) propylene and has a melting point of 140° C. or above, preferably from 150 to 170° C. Preference is given to isotactic homopolypropylene with an n-heptane-soluble fraction of 6% by weight or less, based on the isotactic homopolypropylene. The homopolymer generally has a melt flow index of from 0.5 to 15 g/10 min, preferably from 2.0 to 10 g/10 min.

The copolymers, used in the outer layer and described above generally, have a melt flow index of from 2 to 20 g/10 min, preferably from 4 to 15 g/10 min. The melting point is in the range from 120 to 140° C. The terpolymers, used in the outer layer, have a melt flow index in the range from 2 to 20 g/10 min, preferably from 4 to 15 g/10 min, and a melting point in the range from 120 to 140° C. The blend made from co- and terpolymers and described above has a melt flow index of from 5 to 9 g/10 min and a melting point of from 120 to 150° C. All of the melt flow indices given above are measured at 230° C. and with a load of 21.6 N (DIN 53 735).

If desired, the outer layer polymers may have been peroxidically degraded in the manner described above for the base layer, and in principle the same peroxides are used. The degradation factor for the outer layer polymers is generally in the range from 3 to 15, preferably from 6 to 10. Here, too, the peroxidic degradation of the outer-layer materials can have a favorable effect on the barrier after metallization or oxidical coating.

If desired, hydrocarbon resins may also be added to the outer layer(s) in the manner described above for the base layer. The outer layers generally comprise from 1 to 40% by weight of resin, in particular from 2 to 30% by weight, preferably from 3 to 20% by weight. Embodiments with resin-containing outer layers are particularly advantageous in respect of their optical properties, such as gloss and transparency. Here too, the addition of hydrocarbon resins may have a favorable effect on the barrier after metallization or oxidical coating of the films. Outer layers comprising resin should generally comprise antiblocking agents to ensure good processing through machinery.

The novel film comprises at least the base layer described above. If the film has more than one layer it comprises at least also an outer layer A and, if desired, also another outer layer C. The outer layer C here is arranged on the opposite side of the base layer B. If desired, there may also be one or more intermediate layers applied between the base and the outer layer(s).

Preferred embodiments of the film have three layers. The structure, thickness and composition of a second outer layer may be selected independently of the first outer layer. The second outer layer may likewise comprise one of the polymers or polymer mixtures described above, but this composition does not have to be the same as that of the first outer layer. The second outer layer may, however, also comprise other polymers commonly used for an outer layer.

The thickness of the outer layer(s) is greater than 0.1 $\mu$m, preferably in the range from 0.2 to 5 $\mu$m, in particular from 0.4 to 3 $\mu$m. If there are outer layers on both sides of the base layer, then their thicknesses may be identical or different.

The total thickness of the novel polypropylene film having more than one layer may vary within wide limits and depends on the intended application. It is preferably from 3 to 100 $\mu$m, in particular from 8 to 60 $\mu$m, the base layer making up from about 50 to 96% of the total film thickness.

The density of the film is generally 0.9 g/cm$^2$ or above, preferably from 0.9 to 0.97 g/cm$^3$.

To improve the adhesive properties of the outer layer(s), at least one surface of the film may be corona- or flame-treated. If desired, identical or different treatments of this type may be carried out on both surfaces.

For yet further improvement in certain properties of the novel polyolefin film, either the base layer or the outer layer(s) may comprise an effective amount in each case of other additives, preferably antistats and/or antiblocking agents and/or lubricants and/or stabilizers and/or neutralizing agents, compatible with the propylene polymers of the base layer and of the outer layer(s), except the antiblocking agents, which are generally incompatible. All of the amounts given in percentages by weight (% by weight) in the following description are based on the respective layer or layers to which the additive may have been added.

Preferred antistats are alkali metal alkanesulfonates, polyether-modified (i.e., ethoxylated and/or propoxylated) polydiorganosiloxanes (polydialkylsiloxanes, polyalkylphenylsiloxanes and the like) and/or the essentially straight-chain and saturated aliphatic tertiary amines with an aliphatic radical having from 10 to 20 carbon atoms with substitution by hydroxy-$C_1$-$C_4$-alkyl groups, N,N-bis(2-hydroxyethyl)alkylamines having from 10 to 20 carbon atoms, preferably from 12 to 18 carbon atoms, in the alkyl radical are particularly suitable. Effective amounts of antistats are in the range from 0.005 to 0.5% by weight, and a preferred antistat is from 0.005 to 0.5% by weight of glycerol monostearate. To achieve good barrier values and good metal adhesion it is useful to keep the proportion of antistat low if possible, or even to dispense with antistat entirely.

Suitable antiblocking agents are inorganic additives, such as silica, calcium carbonate, magnesium silicate, aluminum silicate, calcium phosphate and the like, and/or incompatible organic polymers, such as polyamides, polyesters, polycarbonates and the like. Preference is given to benzoguanamineformaldehyde polymers, silica and calcium carbonate. Effective amounts of antiblocking agent are in the range from 0.001 to 2% by weight, preferably from 0.01 to 0.8% by weight. The average particle size is from 1 to 6 $\mu$m, in particular from 2 to 5 $\mu$m. Particles of globular shape, as described in EP-A-0 236 945 and DE-A-38 01 535, are particularly suitable. The antiblocking agents are preferably added to the outer layers.

The lubricants are amides of higher aliphatic acids, esters of higher aliphatic acids, waxes and metal soaps, and also polydimethylsiloxanes. Effective amounts of lubricants are in the range from 0.001 to 3% by weight, preferably from 0.002 to 1% by weight. Addition of amides of higher aliphatic acids in the range from 0.001 to 0.25% by weight in the base layer and/or in the outer layers is particularly suitable. A particularly suitable amide of an aliphatic acid is erucamide. To achieve good barrier values and good metal adhesion it is useful if lubricants can be substantially dispensed with.

Stabilizers which may be used are the typical stabilizing compounds for ethylene polymers, propylene polymers and other $\alpha$-olefin polymers. The amounts of these added are from 0.05 to 2% by weight. Phenolic stabilizers, alkali metal/alkaline-earth metal stearates and/or alkali metal/alkaline-earth metal carbonates are particularly suitable.

Phenolic stabilizers are preferred in amounts of from 0.1 to 0.6% by weight, in particular from 0.15 to 0.3% by weight, and with molar masses above 500 g/mol. Pentaerythritol tetrakis-3-(3,5-di-tert-butyl-4-hydroxyphenyl)-propionate or 1,3,5-trimethyl-2,4,6-tris(3,5-di-tert-butyl-4-hydroxybenzyl)-benzene are particularly advantageous.

Neutralizing agents are preferably calcium stearate and/or calcium carbonate of average particle size not more than 0.7 $\mu$m, absolute particle size less than 10 $\mu$m and specific surface area not less than 40 $m^2$/g.

To achieve the film properties mentioned, in particular the permeation values after metallization or oxidical coating of the films, it has, furthermore, proven advantageous for the film surfaces to have appropriate properties and topographies. For the films described here it is advantageous for at least one of the two surfaces of the film to be described by the following parameters.

a) average roughness $R_a$;
b) static/sliding friction coefficient $\mu$ of this side with respect to itself; and
c) number of elevations/protrusions $N/mm^2$.

It is advantageous if the film is structured in such a way that on this outer surface mentioned above:

a) the $R_a$ value is from 20 to 300 nm;
b) the statics/sliding friction coefficient $\mu_c$ of this layer with respect to itself is less than 0.55; and
c) the number of elevations/protrusions $N_C/mm^2$ is expressed by the equations:

$$A_{h2}-B_{h2}*\log h/\mu m < \log N_c/mm^2 < A_{h3}-B_{h3}*\log h/\mu m \quad (1)$$

where, 0.05 $\mu$m<h<1.0 $\mu$m
$A_{h2}=-1.000$
$B_{h2}=3.70$
$A_{h3}=2.477$
$B_{h3}=2.22$; and $$A_{d2}-B_{d2}*\log d/\mu m < \log N_c/mm^2 < A_{d3}-B_{d3}*\log d/\mu m \quad (2)$$

where, 0.2 $\mu$m<d<10 $\mu$m
$A_{d2}=1.700$
$B_{d2}=3.86$
$A_{d3}=4.700$
$B_{d3}=2.70$.

In a preferred embodiment, $R_a$ is from 30 to 250 nm, in particular from 35 to 200 nm. In a preferred embodiment, the static/sliding friction coefficient $\mu_c$ of this layer with respect to itself is less than 0.50, in particular less than 0.40.

In a preferred embodiment, the constants $A_{h2}$ to $B_{h3}$ in equation (1) have the values $A_{h2}=-0.523$, $B_{h2}=3.523$, $A_{h3}=2.300$ and $B_{h3}=2.3$, and in a particularly preferred embodiment the values are $A_{h2}=0.00$, $B_{h2}=3.300$, $A_{h3}=2.000$ and $B_{h3}=2.400$, and in a very particularly preferably embodiment $A_{h2}=1.420$, $B_{h2}=2.500$, $A_{h3}=2.000$ and $B_{h3}=3.000$.

In a preferred embodiment, the constants $A_{d2}$ to $B_{d3}$ in equation (2) have the values $A_{d2}=2.00$, $B_{d2}=3.630$, $A_{d3}=4.40$ and $B_{d3}=2.70$, and in a particularly preferred embodiment the values are $A_{d2}=2.400$, $B_{d2}=3.720$, $A_{d3}32 4.000$ and $B_{d3}=2.600$, and in a very particularly preferably embodiment $A_{d2}=3.400$, $B_{d2}=2.400$, $A_{d3}=4.000$ and $B_{d3}=3.300$.

For the films described here it has, furthermore, proven useful for the film surface which is subsequently metallized or coated with oxidic materials to obey the following conditions:

$$\log N/mm^2 < 1.4 - 2.5 * \log h/\mu m \quad (3)$$

where, 0.05 $\mu$m<h<1.00 $\mu$m; and $$\log N/mm^2 < 3.4 - 2.4 * \log d/\mu m \quad (4)$$

where, 0.2 $\mu$m<d<10$\mu$m,
N in number/$mm^2$
h in $\mu$m
d in $\mu$m.

If desired, there may also be an intermediate layer between the base layer and the outer layer(s). This intermediate layer may be composed of the polymers described for the base layer. In a particularly preferred embodiment, it is comprised of the polypropylene used for the base layer. It may also comprise the additives described above. The thickness of the intermediate layer is generally greater than 0.3 $\mu$m, preferably from 0.5 to 15 $\mu$m, in particular from 1.0 to 10 $\mu$m and very particularly preferably from 1.0 to 5 $\mu$m.

In the particularly advantageous three-layer embodiment of the novel film, the thickness of the outer layer(s) A (and C) is generally greater than 0.1 µm, preferably from 0.2 to 3.0 µm, advantageously from 0.2 to 2.5 µm, particularly from 0.3 to 2 µm and very particularly preferably from 0.3 to 1.5 µm. The outer layers A and C may have identical or different thicknesses.

The invention further relates to processes for producing the novel film having a single later by monoextrusion processes known in the art and for producing the novel film having more than one layer by coextrusion processes known in the art.

For the purposes of this process the procedure is to coextrude, through a flat-film die, the melts corresponding to the individual layers of the film, to take off the resultant film on one or more chilling rolls to solidify the same, and then to stretch (orient) the film biaxially, to heat-set the biaxially stretched film and, if desired, to corona-or flame-treat the surface layer intended for corona- or flame-treatment.

The biaxial stretching (orientation) is generally carried out sequentially, and preference is given to sequential biaxial stretching which begins with longitudinal (machine-direction) stretching, followed by transverse stretching (perpendicular to the machine direction).

The polymer or polymer mixture for the individual layers is usually firstly compressed and plastified in an extruder as in the coextrusion process, where the polymer or polymer mixture may by this time comprise any additives to be added. In particular the resins are preferably added in the form of a masterbatch. The melts are then simultaneously extruded through a flat-film die and the coextruded film is then taken off on one or more take-off rolls, whereupon it cools and solidifies.

The resultant film is then stretched longitudinally and transversely to the extrusion direction. This causes orientation of the molecular chains. Longitudinal stretching is usefully carried out with the aid of two rolls running at different speeds corresponding to the stretching ratio desired, and transverse stretching with the aid of an appropriate tenter frame. Longitudinal stretching ratios according to the invention are from 4.0 to 9, preferably from 4.5 to 8.0. Transverse stretching ratios should then be selected correspondingly, giving preferably a range of from 5.0 to 11.0.

Biaxial stretching of the film is followed by its heat-setting (heat treatment), where the film is held at a temperature of from 100 to 160° C. for from approximately 0.1 to 10 s. The film is then wound up in a usual manner using wind-up equipment.

It has proven particularly useful for the take-off roll(s) which cool and solidify the extruded film to be maintained at a temperature of from 10 to 100° C., preferably from 20 to 70° C., by means of a heating and cooling circuit.

The temperatures at which longitudinal and transverse stretching are carried out may vary over a relatively wide range and depend on the composition of the base layer mixture and of the outer layer mixture, respectively, and on the desired properties of the film. In general, longitudinal stretching is preferably carried out at from 80 to 150° C. and transverse stretching preferably at from 120 to 170° C.

As mentioned above, one or both surfaces of the film may be corona- or flame-treated by one of the known methods after biaxial stretching, if desired. The intensity of the treatment is generally in the range from 37 to 50 mN/m, preferably from 38 to 45 mN/m.

A useful procedure for the corona-treatment is to pass the film between two conductors serving as electrodes, where the voltage applied between the electrodes, mostly an alternating voltage (from about 5 to 20 kV and from 5 to 30 kHz), is sufficiently high to allow corona discharges to take place. The corona discharge ionizes the air above the film surface and this reacts with the molecules of the film surface in such a way as to produce polar inclusions in the essentially nonpolar polymer matrix.

For flame treatment with a polarized flame (cf. U.S. Pat. No. 4,622,237) a direct voltage is applied between a burner (negative pole) and a cooling roll. The magnitude of the voltage applied is from 400 to 3000 V, preferably from 500 to 2000 V. The voltage applied increases the acceleration of the ionized atoms and the kinetic energy with which they impact the polymer surface. It becomes easier to break the chemical bonds within the polymer molecule, and free-radical formation proceeds more rapidly. The thermal stress on the polymer here is much smaller than in standard flame treatment, and films can be obtained in which the sealing properties of the treated side are even better than those of the untreated side.

In the case of metallization of the film, the metal layer is preferably composed of aluminum. However, other metals which can be applied as a thin and coherent layer are also suitable. A particular example of a suitable material is silicon, which unlike aluminum gives a transparent barrier layer. The oxidic layer is preferably composed of oxides of elements from Groups IIA, IIIA or IVA of the Periodic Table of Elements, in particular oxides of magnesium, aluminum or silicon. The metallic or oxidic materials used are generally those which can be applied at reduced pressure or in vacuo. The thickness of the layer applied is generally from 10 to 100 nm.

A further advantage of the invention is that the production costs of the novel film are comparable with those of the prior art. The other properties of the novel film, which are relevant to processing and use, are essentially unchanged or even improved. In addition, recycled material can be used in producing the film at concentrations of from 10 to 50% by weight, based on the total weight of the film, without any significant adverse effect on the physical properties of the film.

The film is highly suitable for packaging foodstuffs and other consumable items, which may be damaged by light and/or by air.

In summary, the novel film, after it has been metallized or has been coated with oxidic materials, is an excellent oxygen barrier. In addition, it has the desired properties of good processing performance, high gloss and low haze.

The gloss of the film is greater than 120. In a preferred embodiment, the gloss is greater than 125, and in a particularly preferred embodiment it is greater than 130. The film is therefore particularly suitable for printing or for metallizing. The high gloss of the film transfers to the print or to the metal layer applied and thus gives the film the desired appearance, effective for promotional purposes.

The haze of the film is less than 3.0%. In a preferred embodiment, the haze of the film is less than 2.5%, and in a particularly preferred embodiment it is less than 2.0%.

Once it has been metallized or oxidically coated on film surface A, the film has an oxygen permeability value of less than 30 $cm^3$ $m^{-2}$ $d^{-1}$ $bar^{-1}$, preferably less than 27 $cm^3$ $m^{-2}$ $d^{-1}$ $bar^{-1}$ and particularly preferably less than 23 $cm^3$ $m^{-2}$ $d^{-1}$ $bar^{-1}$.

The coefficient of friction on at least one surface of the film is less than 0.6. In a preferred embodiment this coefficient of friction of the film is less than 0.55, and in a particularly preferred embodiment it is less than 0.50.

Table 1 below shows once again the most important properties of the film according to the invention.

TABLE 1

| | Range according to the invention | Preferred | Particularly preferred | Unit | Method of measurement |
|---|---|---|---|---|---|
| Planar orientation | >0.0138 | >0.0140 | >0.0143 | | |
| Refractive index $n_{ND}$ | <0.1495 | <0.1493 | <0.1490 | | |
| Gloss (20° angle of measurement) [1] | >120 | >125 | >130 | | DIN 67 530 |
| Haze [1] | <3.0 | <2.5 | <2.0 | % | ASTM-D 1003-52 |
| Oxygen permeation of metallized film | <30 | <27 | <23 | $cm^3 \, m^{-2} \, d^{-1} \, bar^{-1}$ | DIN 53 380, Part 3 |
| Coefficient of friction of at least one outer layer with respect to itself | <0.6 | <0.55 | <0.50 | | DIN 53 375 |
| Average roughness $R_a$ of at least one outer layer | 30–80 | 35–70 | 40–60 | nm | DIN 4768 with a cut-off of 0.25 mm |

[1] Measured on the unmetallized film

The following methods were used to determine parameters for the raw materials and the films:

(1) Optical Density

Optical density was measured by the Macbeth TD-904 Densitometer from Macbeth (Division of Kollmorgen Instruments Corp.). The optical density is defined as OD=−log $I/I_0$, where I is the Intensity of the incident light, $I_0$ is the intensity of the transmitted light and $I/I_0$ is the transmittance.

(2) Oxygen Barrier

The oxygen barrier of the metallized films was measured using an OX-TRAN 2/20 from Mocon Modem Controls (USA) in accordance with DIN 53 380, Part 3.

(3) Determination of the Planar Orientation Delta p

The planar orientation delta p is determined by measuring the refractive index with an Abbe refractometer using internal operating specification 24:

Preparation of specimens

Specimen size: specimen length: from 60 to 100 mm; specimen width: corresponds to prism width of 10 mm.

To determine $n_{MD}$ and $n_\alpha$ (=$n_{ND}$) the specimen to be measured must be cut out from the film; the running edge of the specimen must run precisely in the direction TD. To determine $n_{TD}$ and $n_\alpha$ (=$n_{ND}$) the specimen to be measured must be cut out from the film; the running edge of the specimen must run precisely in the direction MD. The specimens are to be taken from the middle of the film web. Care must be taken that the temperature of the Abbe refractometer is 23° C.

Using a glass rod, a little diiodomethane (n=1.745) or diiodamethane-bromo-naphthalene mixture is applied to the lower prism, which is cleaned thoroughly before the measurement procedure. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. A second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record for the A side. This is the refractive index $n_{MD}$ in the machine direction.

The scale is now turned using the lower knurled screw until the range visible in the eyepiece is from 1.49 to 1.50. The refractive index $n_\alpha$ or $n_{ND}$ (in the direction of the thickness of the film) is now determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw and the value indicated on the scale is read off and entered into the table for the A side.

The specimen is then turned over, and the corresponding refractive indices $n_{MD}$ and $n_\alpha$ (=$n_{ND}$) for the B side are measured and entered into an appropriate table.

After determining the refractive indices in the direction MD and the direction of the thickness of the film, respectively, the specimen strip cut out in the direction of MD is placed in position and the refractive indices $n_{TD}$ and $n_\alpha$ (=$n_{ND}$) are determined in a corresponding manner. The strip is turned over, and the values for the B side are measured. The values for the A side and the B side are combined to give average refractive indices. The orientation values are then calculated from the refractive indices by the following formulae:

delta $n = n_{MD} - n_{TD}$ delta $p = (n_{MD} + n_{TD})/2 - n_{ND}$ $n_{av} = (n_{MD} + n_{TD} + n_{ND})/3$.

(4) Coefficient of Friction

The coefficient of friction s was determined according to DIN 53 375, 14 days after production of the film.

(5) Surface Tension

The surface tension was determined using the "ink method" (DIN 53 364).

(6) Haze

The haze of the film was measured according to ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 4° pinhole.

(7) Gloss

The gloss was measured according to DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed, representing the light beams hitting the photoelectric detector. The value measured is dimensionless and must be stated together with the angle of incidence.

(8) Determination of the Particle Sizes on Film Surfaces

A scanning electron microscope (e.g., DSM 982 Gemini, Leo GmbH (Zeiss)) together with an image analysis system was used to determine the size distribution of particles of antiblocking agent (particle size distribution) on film surfaces. The magnification selected in all cases was 1700×.

For these measurements, specimens of film are placed flat on a specimen holder. These are then metallized obliquely at an angle $\alpha$ with a thin metallic layer (e.g., of silver). $\alpha$ here is the angle between the surface of the specimen and the direction of diffusion of the metal vapor. The antiblocking agent a particles throw a shadow in this oblique metallization. Since the shadows are not electrically conductive, the specimen can then be further metallized with a second metal (e.g., gold), the second metal vapor here impacting vertically onto the surface of the specimen.

Scanning electron microscope (SEM) images are taken of specimen surfaces prepared in this way. The shadows of the particles of antiblocking agent are visible due to the contrast between metallic materials. The specimen is oriented in the SEM so that the shadows run parallel to the lower edge of the image (x direction). SEM images are taken with this setting and transferred to an image analysis system, which is used to make precise measurements of the lengths of the shadows (in the x direction) and their maximum extent in the y direction (parallel to the vertical edge of the image).

The diameter D of the particles of antiblocking agent at the surface level of the specimen is equal to the maximum extent of the shadows d in the y direction. The height h of the particles of antiblocking agent, measured from the film surface, can be calculated from the angle $\alpha$ of metallization and the length L of the shadows, given knowledge of the magnification V selected for the SEM image:

$h = (\tan(\alpha)*L)/V$.

So as to achieve a sufficiently high level of statistical reliability, precise measurements are made on a few thousand particles of antiblocking agent. Using known statistical methods, frequency distributions are then produced for the diameters and heights of the particles. The class interval selected for this is 0.2 $\mu$m for particle diameter D and 0.05 $\mu$m for particle height h.

(9) Roughness

The roughness $R_a$ of the film was determined in accordance with DIN 4768 with a cut-off of 0.25 mm.

(10) Melt Flow Index

The measurement of melt flow index MFI was based on DIN 53 735, with a load of 21.6 N at 230° C. and, respectively, 50 N at 190° C.

(11) Melting Point

The differential scanning calorimeter (DSC) measured the melting point as the maximum of the melting curve with a heating rate 20° C./min.

EXAMPLE 1

Coextrusion followed by stepwise orientation in the longitudinal and transverse directions was used to produce a transparent two-layer film with AB structure and a total thickness of 20 $\mu$m. The thickness of the respective layers is given in Table 2.

Outer layer A was a mixture made from:

84.00% by weight of isotactic polypropylene with an MIFI of 4 g/10 min, 16.00% by weight of masterbatch made from 99.0% by weight of polypropylene with an MFI of 4 g/10 min, and 0.5% by weight of Sylobloc 44 (colloidal $SiO_2$ from Grace) and 0.5% by weight of Aerosil TT 600 ($SiO_2$ in chain form from Degussa).

Base layer B:

89.80% by weight of polypropylene with an MIFI of 4 g/10 min, 0.20% by weight of N,N-bis-ethoxyalkylamine 10.00% by weight of masterbatch made from 99.0% by weight of polypropylene with an MFI of 4 g/10 min and 0.5% by weight of Sylobloc 44 (colloidal $SiO_2$ from Grace) and 0.5% by weight of Aerosil TT 600 ($SiO_2$ in chain form from Degussa).

The production conditions in the individual process steps were:

Extrusion: Temperatures Layer A: 270° C.
  Layer B: 270° C.
  Temperature of take-off roll: 30° C.
  Die gap width: 1 mm
Longitudinal stretching: Temperature: 80–140° C.
  Longitudinal stretching ratio: 5.0
Transverse stretching: Temperature: 160° C.
  Transverse stretching ratio: 10.0
Setting: Temperature: 150° C.
  Duration: 2 s The film has very good optical properties and good processing performance (cf. Table 3).

After the film had been produced (as in this example and in all of the examples below) its side A was metallized with aluminum in vacuo in an industrial metallizer. The coating rate was 8 m/s and the optical density was 2.6.

The film had the required high oxygen barrier value. The structure of the film and the properties achieved with films produced in this way are given in Tables 2 and 3.

EXAMPLE 2

Coextrusion followed by stepwise orientation in longitudinal and transverse directions was used to produce a transparent three-layer film with ABA structure and an overall thickness of 20 $\mu$m, in a similar manner to that of Example 1.

Outer layers A were a mixture made from:

84.00% by weight of isotactic polypropylene with an MFI of 4 g/10 min, 16.00% by weight of masterbatch made from 99.0% by weight of polypropylene with an MFI of 4 g/10 min and 0.5% by weight of Sylobloc 44 H (colloidal $SiO_2$ from Grace) and 0.5% by weight of Aerosil TT 600 ($SiO_2$ in chain form from Degussa).

Base layer B:

89.80% by weight of polypropylene with an MFI of 4 g/10 min, 0.20% by weight of N,N-bis-ethoxyalkylamine.

The process conditions for all of the layers were the same as chosen for Example 1.

EXAMPLE 3

Coextrusion followed by stepwise orientation in longitudinal and transverse directions was used to produce a transparent three-layer film with ABC structure and an overall thickness of 20 µm. The only change compared with Example 2 was in the one of the outer layers A.

Outer layer A was a mixture made from:

96.00% by weight of isotactic polypropylene with an MFI of 4 g/10 min, 4.00% by weight of masterbatch made from 99.0% by weight of polypropylene with an MFI of 4 g/10 min and 0.5% by weight of Sylobloc 44 H (colloidal $SiO_2$ from Grace) and 0.5% by weight of Aerosil TT 600 ($SiO_2$ in chain form from Degussa).

Outer layer C was a mixture made from:

84.00% by weight of isotactic polypropylene with an MFI of 4 g/10 min, 16.00% by weight of masterbatch made from 99.0% by weight of polypropylene with an MFI of 4 g/10 min and 0.5% by weight of Sylobloc 44 H (colloidal $SiO_2$ from Grace) and 0.5% by weight of Aerosil TT 600 ($SiO_2$ in chain form from Degussa).

The process conditions for all of the layers were the same as chosen for Example 1.

EXAMPLE 4

Coextrusion followed by stepwise orientation in longitudinal and transverse directions was used to produce a transparent three-layer film with ABC structure and a total thickness of 20 µm, in a manner similar to that of Example 2. The only change compared with Example 2 was in one of the outer layers A.

Outer layer A was a mixture made from:

99.00% by weight of isotactic polypropylene with an MFI of 4 g/10 min, 1.00% by weight of masterbatch made from 99.0% by weight of polypropylene with an MFI of 4 g/10 min and 0.5% by weight of Sylobloc 44 H (colloidal $SiO_2$ from Grace) and 0.5% by weight of Aerosil TT 600 ($SiO_2$ in chain form from Degussa).

The process conditions for all of the layers were the same as chosen for Example 1.

EXAMPLE 5

Coextrusion followed by stepwise orientation in longitudinal and transverse directions was used to produce a transparent three-layer film with ABC structure and a total thickness of 20 µm. The only change compared with Example 3 was in the conditions for longitudinal stretching.

The production conditions for the individual process steps were:

Extrusion: Temperatures Layer A: 270° C.
  Layer B: 270° C.
  Layer C: 270° C.
  Temperature of take-off roll: 30° C.
  Die gap width: 1 mm Longitudinal stretching: Temperature: 80–135° C.
  Longitudinal stretching ratio: 5.0

Transverse stretching: Temperature: 160° C.
  Transverse stretching ratio: 10.0

Setting: Temperature: 150° C.
  Duration: 2 s

EXAMPLE 6

Coextrusion followed by stepwise orientation in longitudinal and transverse Y directions was used to produce a transparent three-layer film with ABC structure and a total thickness of 20 µm, in a manner similar to that of Example 3. The only change compared with Example 3 was in the outer layer A.

Outer layer A was a mixture made from:

86.00% by weight of polypropylene with an MFI of 4 g/10 min, 4.00% by weight of masterbatch made from 99.0% by weight of polypropylene with an MFI of 4 g/10 min and 0.5% by weight of Sylobloc 44 H (colloidal $SiO_2$ from Grace) and 0.5% by weight of Aerosil TT 600 ($SiO_2$ in chain form from Degussa), 10.00% by weight of hydrocarbon resin (®Regalrez 1139 from Hercules Inc.) with a softening temperature of 140° C. and a molecular weight of 2500.

The process conditions for all of the layers were the same as chosen for Example 1.

Comparative Example

Coextrusion followed by stepwise orientation in longitudinal and transverse directions was used to produce a transparent three-layer film with ABC structure and a total thickness of 20 µm. The only change compared with Example 3 was the conditions for longitudinal stretching.

The production conditions for the individual process steps were:

Extrusion: Temperatures Layer A: 270° C.
  Layer B: 270° C.
  Layer C: 270° C.
  Temperature of take-off roll: 30° C.
  Die gap width: 1 mm Longitudinal stretching: Temperature: 80–143° C.
  Longitudinal stretching ratio: 5.0

Transverse stretching: Temperature: 160° C.
  Transverse stretching ratio: 10.0

Setting: Temperature: 150° C.
  Duration: 2 s

TABLE 2

| Example | Film thickness μm | Film structure | Layer thicknesses A B C μm | Pigments in the layers A | Pigments in the layers B | Pigments in the layers C | Average pigment diameter A | Average pigment diameter B | Average pigment diameter C | Pigment concentration A (ppm) | Pigment concentration B (ppm) | Pigment concentration C (ppm) |
|---|---|---|---|---|---|---|---|---|---|---|---|---|
| E 1 | 20 | AB | 1.5/18.5 | Sylobloc 44 H / Aerosil TT 600 | Sylobloc 44 H / Aerosil TT 600 | none | 2.5 / 0.04 | 2.5 / 0.04 | | 800 / 800 | 500 / 500 | 0 / 0 |
| E 2 | 20 | ABA | 1.5/17.0/1.5 | Sylobloc 44 H / Aerosil TT 600 | none | Sylobloc 44 H / Aerosil TT 600 | 2.5 / 0.04 | | 2.5 / 0.04 | 800 / 800 | 0 / 0 | 800 / 800 |
| E 3 | 20 | ABC | 1.5/17.0/1.5 | Sylobloc 44 H / Aerosil TT 600 | none | Sylobloc 44 H / Aerosil TT 600 | 2.5 / 0.04 | | 2.5 / 0.04 | 200 / 200 | 0 / 0 | 800 / 800 |
| E 4 | 20 | ABC | 1.5/17.0/1.5 | Sylobloc 44 H / Aerosil TT 600 | none | Sylobloc 44 H / Aerosil TT 600 | 2.5 / 0.04 | | 2.5 / 0.04 | 50 / 50 | 0 / 0 | 800 / 800 |
| E 5 | 20 | ABC | 1.5/17.0/1.5 | Sylobloc 44 H / Aerosil TT 600 | none | Sylobloc 44 H / Aerosil TT 600 | 2.5 / 0.04 | | 2.5 / 0.04 | 200 / 200 | 0 / 0 | 800 / 800 |
| E 6 | 20 | ABC | 1.5/17.0/1.5 | Sylobloc 44 H / Aerosil TT 600 | none | Sylobloc 44 H / Aerosil TT 600 | 2.5 / 0.04 | | 2.5 / 0.04 | 200 / 200 | 0 / 0 | 800 / 800 |
| CE 1 | 20 | ABC | 1.5/17.0/1.5 | Sylobloc 44 H / Aerosil TT 600 | none | Sylobloc 44 H / Aerosil TT 600 | 2.5 / 0.04 | | 2.5 / 0.04 | 200 / 200 | 0 / 0 | 800 / 800 |

TABLE 3

| Example | Planar orientation delta p | Oxygen barrier values cm³/(m² bar d) | Coefficient of friction μk A/A | Coefficient of friction μk C/C (B/B) | Roughness $R_a$ Side A nm | Roughness $R_a$ Side C (Side B) | Gloss [1] Side A (Side B) | Gloss [1] Side C (Side B) | Haze [1] % | Processing performance |
|---|---|---|---|---|---|---|---|---|---|---|
| E1 | 0.0142 | 28 | 0.52 | 0.58 | 60 | 40 | 125 | 130 | 2.8 | good |
| E2 | 0.0143 | 27 | 0.54 | 0.53 | 60 | 60 | 127 | 126 | 1.7 | good |
| E3 | 0.0143 | 25 | 0.6 | 0.55 | 25 | 56 | 140 | 122 | 1.5 | good |
| E4 | 0.0143 | 23 | 1.7 | 0.56 | 15 | 55 | 145 | 122 | 1.4 | good |
| E5 | 0.0146 | 20 | 0.6 | 0.55 | 25 | 55 | 140 | 122 | 1.5 | good |
| E6 | 0.0142 | 22 | 0.7 | 0.57 | 23 | 50 | 142 | 122 | 1.4 | good |
| CE1 | 0.0134 | 38 | 0.6 | 0.54 | 24 | 55 | 133 | 124 | 1.5 | good |

[1] Measured on the unmetallized film
Side A: metallized outer layer; the oxygen barrier was measured on the metallized film
Side C: unmetallized outer layer

What is claimed is:

1. A biaxially oriented polypropylene film with one or more layers, comprising at least a base layer composed of at least 50% by weight of a polypropylene, wherein the planar orientation delta p of the film is greater than about 0.0138, and wherein the refractive index $n_{ND}$ in the direction of the thickness of the film is less than about 0.1495.

2. The polypropylene film of claim 1, wherein the base layer comprises at least about 75% by weight of polypropylene.

3. The polypropylene film of claim 1, wherein the base layer comprises at least about 80% by weight of polypropylene.

4. The polypropylene film of claim 1, wherein the base layer comprises at least about 90% by weight of polypropylene.

5. The polypropylene film of claim 1, wherein the polypropylene of the base layer is a thermoplastic polypropylene.

6. The polypropylene film of claim 1, wherein the film has two surfaces and at least one surface is metallized.

7. The polypropylene film of claim 1, wherein the film has two surfaces and at least one surface is oxidically coated with a oxides of elements from the group consisting of Group IIA, IIIA and IVA elements from the Periodic Table of Elements.

8. A polypropylene film as claimed in claim 1, wherein the planar orientation delta p of the film is greater than about 0.0140.

9. A polypropylene film as claimed in claim 1, wherein the planar orientation delta p of the film is greater than about 0.0143.

10. A polypropylene film as claimed in claim 6, wherein the oxygen permeability of the metallized film is less than 30 cm³/m² bar d.

11. A polypropylene film as claimed in claim 7, wherein the oxygen permeability of the oxidically coated film is less than 30 cm³/m² bar d.

12. A polypropylene film as claimed in claim 6, wherein the oxygen permeability of the metallized film is less than 27 cm³/m² bar d.

13. A polypropylene film as claimed in claim 7, wherein the oxygen permeability of the oxidically coated film is less than 27 cm³/m² bar d.

14. A polypropylene film as claimed in claim 6, wherein the oxygen permeability of the metallized film is less than 23 cm³/m² bar d.

15. A polypropylene film as claimed in claim 7, wherein the oxygen permeability of the oxidically coated film is less than 23 cm³/m² bar d.

16. A polypropylene film as claimed in claim 1, wherein the film has at least one outer layer.

17. A polypropylene film as claimed in claim 16, wherein the thickness of the outer layer(s) is greater than about 0.1 μm.

18. A polypropylene film as claimed in claim 16, wherein the film has multiple outer layers and the thickness of the outer layers are, independently, the same or different.

19. A polypropylene film as claimed in claim 16, which has a three-layer structure comprising:

(A) an outer layer A, (B) the base layer B, and (C) another outer layer C, wherein the outer layer C has been applied to the side of the base layer B opposite to the outer layer A.

20. A polypropylene film as claimed in claim 19, wherein the thickness of the outer layers is greater than about 0.1 μm.

21. A polypropylene film as claimed in claim 19, wherein the film has multiple outer layers and the thickness of the outer layers are, independently, the same or different.

22. A polypropylene film as claimed in claim 16, wherein at least one of the outer layers comprise pigments.

23. A polypropylene film as claimed in claim 16, wherein the outer layers have the same or different pigments.

24. A process for producing a biaxially oriented polypropylene film having one or more layers as claimed in claim 1, comprising the steps:

(A) feeding polypropylene melts, whose compositions correspond to those of the outer and base layers, to a mono- or coextrusion die;

(B) extruding the result from step (A) onto a chill roll; and (C) biaxially orienting and heat-setting the resultant prefilm;

wherein the planar orientation delta p of the resultant film is greater than about 0.013 and wherein the refractive index $n_{ND}$ in the direction of the thickness of the film is less than about 0.1495.

25. The process of claim 24, wherein the biaxial orientation is conducted by first stretching the prefilm in the longitudinal direction and then by stretching in the traverse direction.

26. The process of claim 24, wherein the resultant film is corona treated.

27. The process of claim 24, wherein the resultant film is flame treated.

28. The process of claim 24, in which recycled material is fed to the extrusion die at a concentration of from about 10 to about 50% by weight, based on the total weight of the film.

29. A method for packaging foodstuffs and other consumable items comprising packaging said foodstuffs and other consumable items in a film as claimed in claim 1.

* * * * *

UNITED STATES PATENT AND TRADEMARK OFFICE
CERTIFICATE OF CORRECTION

PATENT NO. : 6,410,132 B1
DATED : June 25, 2002
INVENTOR(S) : Herbert Peiffer et al.

It is certified that error appears in the above-identified patent and that said Letters Patent is hereby corrected as shown below:

<u>Column 20,</u>
Line 4, "0.013" should read -- 0.0138 --.

Signed and Sealed this

Fifth Day of November, 2002

Attest:

Attesting Officer

JAMES E. ROGAN
*Director of the United States Patent and Trademark Office*